United States Patent [19]

Brockenbrough et al.

[11] Patent Number: 4,852,704
[45] Date of Patent: Aug. 1, 1989

[54] ENERGY ABSORPTION AND BARRIER DEVICE FOR AUTOMOTIVE VEHICLES AND METHOD FOR MAKING THE SAME

[75] Inventors: Roger L. Brockenbrough, Scott Township, Allegheny County, Pa.; Donald L. Douty, Oakland County, Mich.

[73] Assignee: USX Corporation, Pittsburgh, Pa.

[21] Appl. No.: 141,176

[22] Filed: Jan. 6, 1988

[51] Int. Cl.$^4$ .............................................. F16F 7/12
[52] U.S. Cl. ..................................... 188/376; 52/799; 267/36.1; 267/165; 267/260; 293/135
[58] Field of Search .............. 188/371, 376; 267/37.3, 267/36.1, 47, 164, 165, 158; 52/795, 799; 293/133, 135

[56] References Cited

U.S. PATENT DOCUMENTS

| 147,644 | 2/1874 | Jeffrey | 267/47 |
|---|---|---|---|
| 1,792,343 | 2/1931 | Wikander | 267/47 |
| 1,859,105 | 5/1932 | Munro | 267/47 X |
| 1,956,173 | 4/1934 | Katzman et al. | 52/799 X |
| 2,010,668 | 8/1935 | Hirshfeld | 267/165 X |
| 2,098,505 | 11/1937 | McCullough et al. | 267/165 X |
| 4,753,772 | 6/1988 | Schmertz | 188/376 X |

FOREIGN PATENT DOCUMENTS

| 905211 | 4/1945 | France | 52/799 |
|---|---|---|---|
| 1152521 | 9/1957 | France | 52/795 |
| 263023 | 12/1926 | United Kingdom | 267/47 |

*Primary Examiner*—George E. A. Halvosa
*Attorney, Agent, or Firm*—W. F. Riesmeyer, III

[57] ABSTRACT

An energy and absorption and barrier device for automotive vehicles and a method manufacture thereof. The device includes a plurality of metal strips in stacked relation having sinusoidal shapes and devices for securing the ends of the strips together. The method involves forming the strips in dies having adjustable stroke lengths so as to successively form corrugations in the strip in sequence from the center to the outer ends of the strip.

6 Claims, 3 Drawing Sheets

ENERGY ABSORPTION AND BARRIER DEVICE FOR AUTOMOTIVE VEHICLES AND METHOD FOR MAKING THE SAME

BACKGROUND OF THE INVENTION

The present invention relates to an energy absorption and barrier device for automotive vehicles, and particularly to an intrusion barrier for the doors of such vehicles.

Current side door intrusion devices are either stamped sheet or roll-formed high-strength tubular beams that are attached by hardware to the door's vertical edges. These devices are designed to absorb specified amounts of energy at a plurality of predetermined spaced deflection distances upon receipt of impact according to specifications of the United States Government and various automotive manufacturers. The tubular beam intrusion devices weigh less and are most costly to manufacture than the stamped-style beams.

A multi-layer energy absorption device is disclosed in U.S. Pat. No. 3,930,665, Ikawa. This device is comprised of first and second elongated thin steel sheets 11 and 12 in generally spaced relationship and a third or corrugated or wavy thin steel sheet 13 interposed therebetween (col. 1, lines 32-35). Alternating ridges 13a of thin sheet 13 are preferably spot-welded as at 16 to the inner surfaces of sheets 11 and 12 (col. 1, lines 46-48). Sheets 11 and 12 are provided with rows of serially arranged slots 15 (col. 1, lines 48-50). Upon impact, fracture or shearing of sheet 12 readily occurs along the rows of slots 15 and subsequently locally deforms and crushes the corrugated sheet 13 (col. 1, lines 55-59). It is to be noted that the sheets in this device do not successively deflect to greater distances from a plane and then fracture so as to sequentially absorb greater amounts of energy upon impact. The reference states, however, that this device may be used on the inner wall of the door panels (col. 2, lines 6-13) and can be provided on the impact receiving surface with a resilient padding 20 such as foam rubber (col. 2, lines 13-16). An energy-absorbing bumper of progressively deformable structure in the form of transversely extending pipe-like members is disclosed in U.S. Pat. No. 3,806,180, Patterson. A vehicle door intrusion device comprised of a band of continuous glass fibers is disclosed in U.S. Pat. No. 4,290,235, Jahnle, et al. A plurality of elongated soft metal pipes of varying diameters are positioned one within another in such manner as to permit progressive deformation of the same transversely of the principal axis of each (col. 2, lines 29-33). The tubes are not arranged in concentric fashion but rather are held in mutual contact along one line of each by a clip 41 which may be substituted by spot welding (col. 2, lines 44-47). Similarly, a vehicle end structure is disclosed in U.S. Pat. No. 3,138,118, Dean, which will crush initially when subjected to impact and thereafter give progressively increasing resistance with relatively great energy absorption over a considerable displacement distance (col. 1, lines 29-34). Also, incremental energy absorption systems are known for use on ships, e.g. aircraft carriers. U.S. Pat. No. 2,192,813, Crede, shows corrugated reinforcing sheet 37 having corrugations 36 of a somewhat differant contour than the corrugations 38 in the end wall plate 39 (col., lines 27-31) of a rail car as shown in FIG. 7, thereof. Other energy absorption devices are disclosed in U.S. Pat. Nos. 3,937,407, Matsuo, and 4,264,094, White, et al.

It is a primary object of this invention to provide a multi-layer energy absorption and barrier device for automotive vehicles which will be lighter and less expensive to manufacture than those currently used.

SUMMARY OF THE INVENTION

According to this invention, an energy absorption and barrier device is provided for automotive vehicle, which device includes a plurality of elongated sheet metal strips mounted in stacked relation and having sinusoidal shapes and means for securing opposed ends of the sheet metal strips together and to a support surface of the vehicle. Each of the elongated sheet metal strips has spaced nodes occurring at substantially the same locations in the longitudinal direction as those on the other of the strips. Corresponding nodes on the strips have maximum depths, i.e. maximum depth from a flat plane as assembled prior to impact, in the transverse direction increasing in degree from said one of the strips adjacent to a direction from which impact is to be received to the other of said strips remote therefrom. The total length of the strips in the node portions thereof also increases in the same order as the degree of deflection thereof. The strips therefore will provide fracture absorption energies increasing in said order at increased deflection distances with respect to the direction from which impact is to be received.

DESCRIPTION OF THE PREFERRED EMBODIMENT

Figure 1:
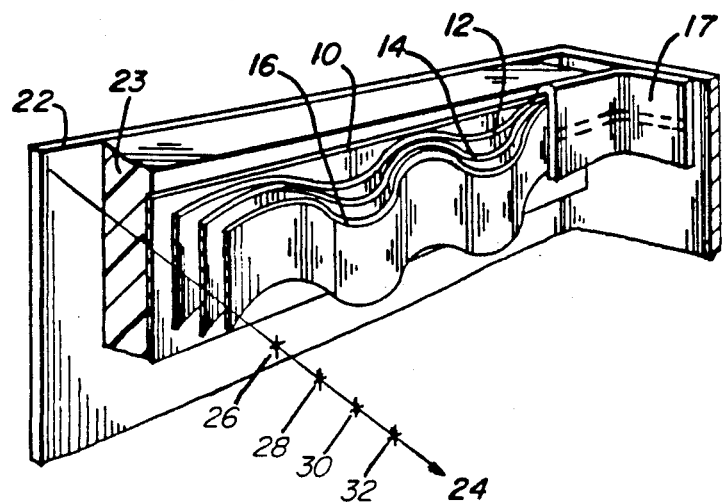
FIG. 1 is a isometric view of a portion of the barrier device of this invention mounted on an outer panel of a vehicle door.
Figure 2:
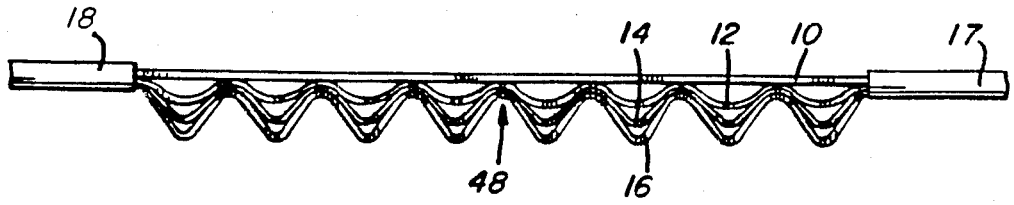
FIG. 2 is a full-length plan view of a barrier device similar to that shown in FIG. 1.

Referring to FIG. 1, the device of this invention includes a flat sheet metal strip 10, first sinusoidal-shaped sheet metal strip 12, second sinusoidal-shaped sheet metal strip 14, third sinuosidal-shaped sheet metal strip 16, and a pair of brackets 17 (FIG. 1) and 18 (FIG. 2) for securing opposed narrow ends of the strips together. The brackets are secured to vertical posts of a vehicle door one of which is partially illustrated at 22 in FIG. 1. A layer of foam 23 may be provided as shown in the drawing for additional cushioning of impact forces received from the direction 24 by the vehicle door at an outer panel thereof. The device is designed as more fully described below to absorb energy in progressive fashion in successive stages upon deflection and fraction of strip 10 at point 26, strip 12 at point 28, strip 14 at point 30, and strip 16 at point 32. In an actual example of the device, deflection and fracture at these points requires the following calculated values 5760, 6190, 7200, and 7200 of pounds of force, respectively, thus typically providing the desired progressive absorption of energy (product of force and deflection) as desired and specifed by automotive manufacturers. The actual performance of the device will vary depending on the geometry of the vehicle door, the shape of the strip material properties.

Figure 3:
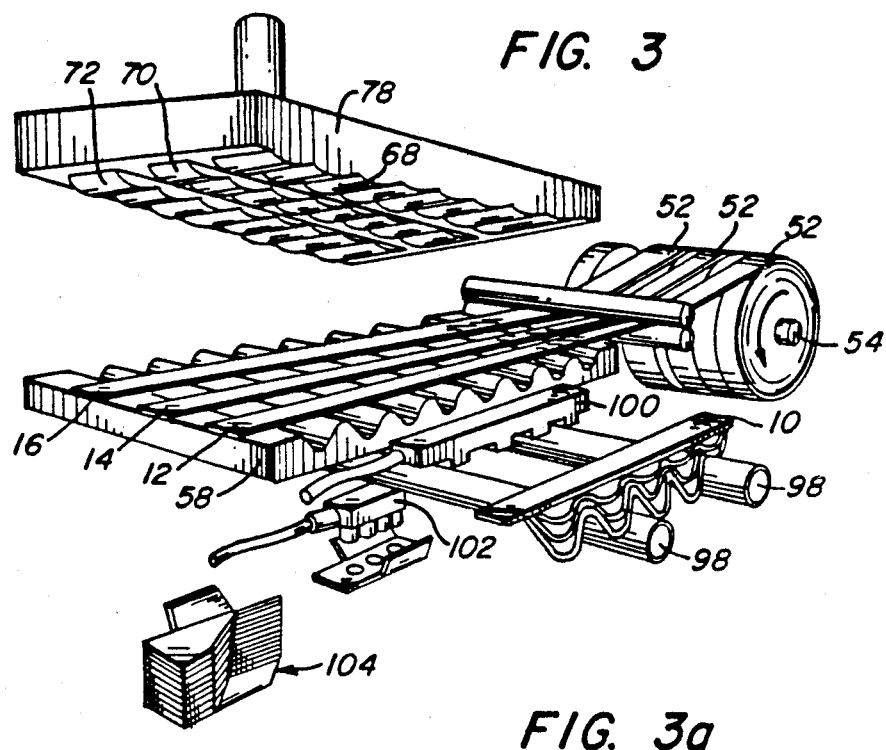
FIG. 3 is a schematic isometric representation of apparatus for corrugating the elongated sheet metal strips, and showing adhesive bonding the strip ends and means for securing the end portions together.
Figure 3A:
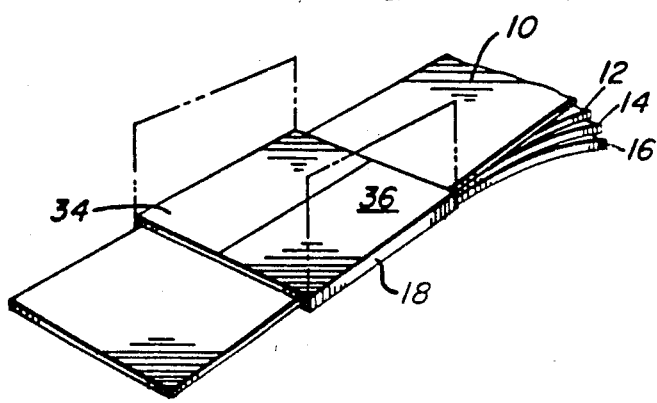
FIG. 3a is an enlarged view of the means for securing the strip end portions together and a partial representation of the strips secured therein.
Figure 8:
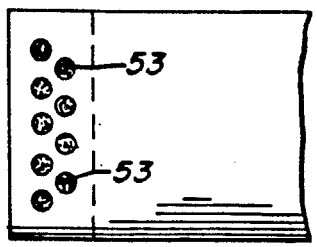
FIG. 8 is a plan view of a preferred arrangement of spot welds for securing the brackets to a vehicle door.
Figure 8A:
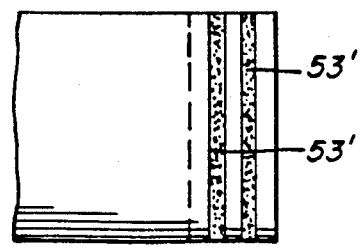
FIG. 8a is an alternative arrangement of seam welds for securing the brackets to a vehicle door.
Figure 5:
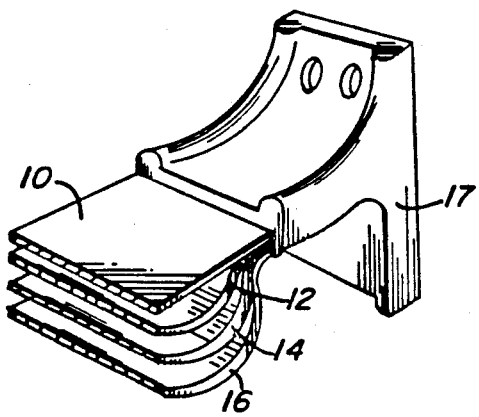
FIG. 5 is an isometric view of an alternate means for securing end portions of the metal strips together.
Figure 6:
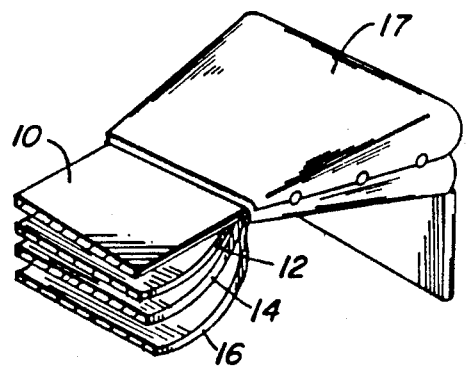
FIG. 6 is an isometric view of another alternate means for securing end portions of the metal strips together.
Figure 7:
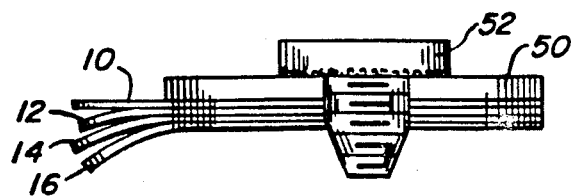
FIG. 7 is a plan view of still another alternate means for securing end portions of the metal strips together.

In the above-mentioned actual example of the device, steel strips 10, 12, 13 and 16 (FIG. 2) all have 0.020-inch thickness and 3-inch width. The strips are of 33-, 31-, 29- and 27-inch lengths, respectively. They are of a high-strength steel composition treated so as to have 60 ksi specified minimum yield strength and 20% specified minimum elongation. Strips 12, 14 and 16 have nodes of successively increasing depth but the same pitch, i.e. the maximum depth of deflection of the nodes in each strips as assembled, are spaced apart the same distance. Furthermore, preferably such points of maximum depth of deflection are located at the same points on each strip. The maximum depths are: $\frac{3}{4}$-inch for strip 12, $1\frac{1}{4}$-inch for strip 14, and $1\frac{3}{4}$-inch for strip 16. Brackets 17 and 18 are stiffer and generally thicker than the strips. Tabs 34 and 36 of each bracket are bent over as shown in FIG. 3a so as to secure the ends of the strips. The tabbing can also be provided with an independent, flat clip. The brackets are secured to vertical posts of the door for example by spot welds. Preferably, a layer of an acrylic modified epoxy adhesive is provided between adjacent surfaces of the strips and between the strips within the brackets. A layer of weaker adhesive, such as thermoplastic, preferably is also provided between abutted portions of each of the strips at locations 48 between each of the corrugations or nodes (FIG. 2) thereof to hold the strips in contact until the assembly is impacted. It will be apparent that alternate means such as metal wire or clips may be used to secure the abutted portions of the strips. Alternate means for securing the opposed ends of the strips are disclosed in FIGS. 5, 6 and 7. FIG. 5 shows an injection molded thermoplastic end fitting. FIG. 6 shows the strips socketed in spaced separated relation internally by an acrylic epoxy as mentioned above within a steel bracket. FIG. 7 shows a clamping plate 50 and metal self-tapping screw 52 for securing the strips together and to a vertical post of the vehicle door. FIG. 8 shows a preferred arrangement of resistance spot welds 53 for securing the strips to the brackets. FIG. 8a is an alternative arrangement for utilizing seam welds 53′ for securing the strips to the brackets.

Figure 4:
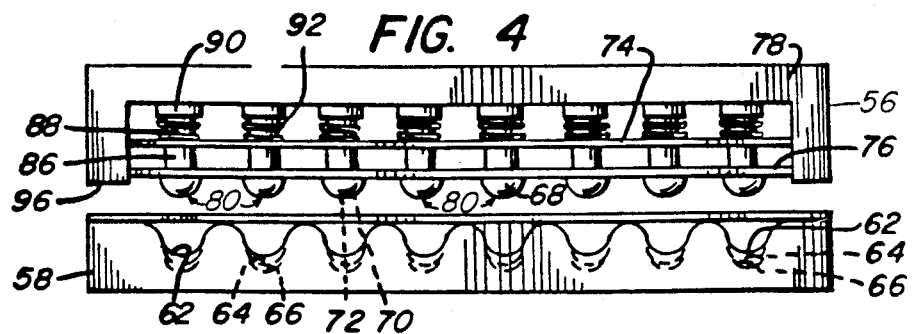
FIG. 4 is a schematic side elevation view of the apparatus shown in FIG. 3 for corrugating the elongated sheet metal strips used in the barrier invention device of this invention.
Figure 4A:
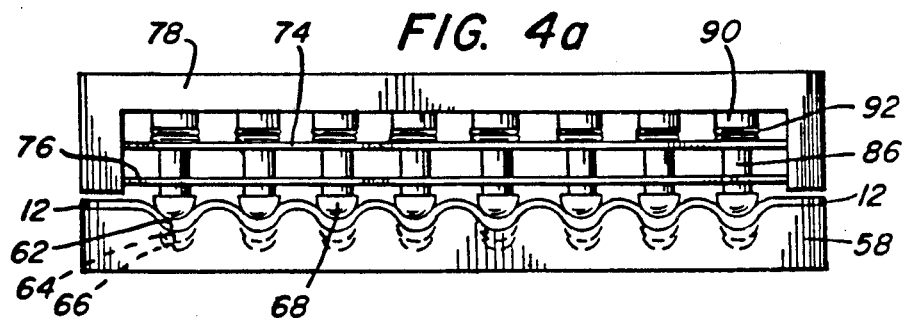
FIG. 4a is a view similar to FIG. 4 showing the upper die pressed downwardly against the lower die to form corrugation in the strips therebetween.

The energy absorption and barrier device may be manufactured and assembled as described below. Coils 52 (FIG. 3) of steel strip which have been slit to the desired width are mounted on a conventional payoff reel 54 comprising a common arbor as shown or separate arbors for each coil, for feeding strips into position between dies 56 and 58. Desirably, the number of strips is equal to the number of sinusoidal-shaped strips to be included in the final assembled intrusion barrier device. Preferably, mechanical stops (not shown) are provided to properly align the leading edge of the strip from each coil at the end of bottom die 58 remote from payoff reel 54. Bottom die 58 has spaced sinusoidal-shaped corrugations 62, 64, and 66 which together with mateable top die segments 68, 70, and 72 in top die 56 are adapted to form the strips into sinusoidal shapes. The corrugations 62 are of relatively shallow depth for forming the sinusoidal-shaped portions in strip 12 of FIG. 1. The top die segments 68 of top die 56 are of mateable depth and shape with the corrugations 64. The corrugations 64 are of medium depth for forming the sinusoidal-shaped portions of strip 14 and again the top die segments 70 are mateable with corrugations 64. Similarly, corrugations 66 are of greater depth than both corrugations 62 and 64 and are mateable with top die segments 72. Top die 56 (FIG. 4) includes a plurality of upper and lower plates 74 and 76 secured in frame 78. A plurality of adjustable length strikers 80 are slidably mounted in spaced mateable holes in the upper and lower plates, respectively. Each striker includes a heavy metal strip or solid top die segment of sinusoidal shape 64, 66, or 68 attached to internally threaded pipe sleeve 86. An externally threaded stud member 88 is threadedly engaged with pipe sleeve 86. Stud member 88 has a flanged head portion 90 serving as a retainer for compression spring 92 between it and upper plate 74. Each opposed end portion of frame 78 has one or more rounded protrusions 96 for forming dimples on the strip ends as described later hereinbelow. Preferably bottom die 58 is fixed as shown in FIG. 4 and top die 56 is reciprocably movable upward and downward. The top die strikers in each row, i.e., for forming each strip, are adjusted to control their time of downward motion relative to each other. This is necessary to provide equal "draw-in" of the strip from each of the opposed ends of the die during the forming operation so as not to incur excessive stretching of the metal. This is crucial to proper performance of the assembled barrier device by retaining as much ductility as possible for potential elongation of the strips upon impact. Proper fine adjustment of striker height will provide controlled "hold-down" of the strip to achieve the desired amount of frictional sliding of the strip in the die for precise yielding of the strip and a reliable ultimate shape after forming. Ideally, if there is an odd number of corrugations, the center striker or punch of the row thereof for forming each strip will fully engage the strip and other die first and then symmetrical pairs, i.e., on opposite sides of the center striker, will engage with the end strikers being last to engage and form the strip. If there is an even number of corrugations, forming proceeds in the same manner except that the center pair of strikers fully engage the strip and other die first. The flat ends of the strips are then formed and dimpled to control adhesive bond-line thickness on both ends, then are simultaneously trimmed to length. A pair of table rolls 98 (FIG. 3) are provided adjacent to one side of the dies so that the formed strips may be removed from the dies and assembled together. A manifold schematically illustrated at 100 is provided for placing hot melt modified acrylic epoxy at spaced locations 48 on each strip prior to its assembly into the energy absorption device. Similarly, a second manifold 102 is provided for placing other adhesive at spaced locations on each end bracket from stack 104 thereof.

It is essential that the length of the strikers be adjusted so as to control their motion relative to each other. Specifically, it is essential that the central striker in the case of an odd number of corrugations or the central pair of strikers in the case of an even number of corrugations be the first to penetrate and fully press the strip into the corresponding corrugation in the bottom die. The other strikers are adjusted so that the two immediately adjacent to the central striker are the next to penetrate and fully press the strip into the corresponding corrugations in the bottom die. The other strikers are adjusted so that next adjacent pairs act successively to press the strip into corrugations in the bottom die. This feature causes the top die to draw the strip inwardly at equal rates from each of its opposite ends to fill the corrugations in the bottom die. In turn, this prevents excessive stretching of the strip and retains as much of its ductility as possible for potential elongation on impact in the assembled barrier device. At the same time, the strikers are adjusted so as to cause the desired amount of frictional sliding of the strip in the dies to control its precise yielding for forming a reliable, reproducible ultimate strip shape.

In operation, strip from the coils is fed between the dies until the leading edges thereof abut the mechanical stops. The strips are then cut off by a shear device (not shown) to their proper length. The dies are closed so as to form the strips into sinusoidal shapes. The strips are then moved laterally onto the adjacent table rolls for assembly into an energy absorption device. Hot melt adhesive is applied onto the surface of each strip and the strips are stacked together. Then adhesive is applied to a pair of brackets and the brackets are crimped so as to fasten the ends of the strips together. The crimped area insures good lap shear performance of the adhesive during rapid force loading. It will be apparent that in this preferred form dies for forming strips with successively greater maximum node depths are arranged side-by-side in the die assembly. This permits the assembly of an energy absorption device from each group of strips as they are made and formed into sinuosoidal shapes in the dies.

Various other alternative embodiments of the invention will be apparent to those skilled in the art. For example, the width and cross-sectional area of the various strips as well as their composition, strength and elongation properties may be varied in order to regulate the degree of deflection and their energy absorption at fracture. The invention provides a lighter, less expensive intrusion barrier especially suitable for vehicle doors.

We claim:

1. An energy absorption and barrier device for automotive vehicles, said device comprising:
    (a) a plurality of elongated sheet metal strips mounted in stacked relation and each having a corrugated sinusoidal shape in said elongated direction thereof, and
    (b) means for securing only the opposed narrow ends of said sheet metal strips together at fixed spaced locations to a support surface of said vehicle, each of said elongated sheet metal strips having a plurality of spaced nodes occurring at substantially the same locations in the longitudinal direction as those on the other of said strips, said nodes being plastically deformed portions of the strips which retain a corrugated shape after forming, the longitudinal edges of the nodes of said strip which extend in a transverse direction to the longitudinal axes of the corrugations being not secured together, corresponding nodes on said sheet metal strips having maximum depths in the transverse direction increasing in degree from said one of the strips adjacent to a direction from which impact to be received to the other of said strips remote therefrom such that the total length of said strips in the node portions thereof also increases in the same order as the depth of said nodes, said device not having a flat retaining strip on the side thereof remote from that on which impact is to be received whereby said strips will have fracture absorption energies increasing in said order at increased deflection distances with respect to said direction from which impact is to be received.

2. The device of claim 1 further comprising a flat sheet metal strip mounted in stacked relation with said sinusoidal-shaped sheet metal strips on the side thereof in the direction from which impact is to be received.

3. The device of claim 1 wherein said securing means includes a pair of end brackets and a layer of adhesive material for bonding the opposed narrow ends of said elongated sheet metal strips to said end brackets.

4. The device of claim 1 wherein said securing means includes a pair of end brackets and the opposed narrow ends of the sheet metal strips are welded to said end brackets.

5. The device of claim 1 further comprising means for securing abutted areas of the node portions of the sinusoidal-shaped sheet metal strips together.

6. The device of claim 1 wherein each of said sinusoidal-shaped strips has a different cross-sectional area than the others thereof, the cross-sectional area of each of said sinusoidal-shaped strips being uniform along its length.

* * * * *